United States Patent
Duval

(10) Patent No.: US 7,715,557 B2
(45) Date of Patent: May 11, 2010

(54) METHOD FOR MANAGING RIGHTS OF SUBSCRIBERS TO A MULTI-OPERATOR PAY-TELEVISION SYSTEM

(75) Inventor: Grégory Duval, La Conversion (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1006 days.

(21) Appl. No.: 11/052,913

(22) Filed: Feb. 9, 2005

(65) Prior Publication Data

US 2005/0183112 A1    Aug. 18, 2005

(30) Foreign Application Priority Data

Feb. 13, 2004    (EP)    ................... 04100604

(51) Int. Cl.
| H04N 7/167 | (2006.01) |
| H04N 7/16 | (2006.01) |
| H04L 9/00 | (2006.01) |
| G06F 7/04 | (2006.01) |
| G06F 17/30 | (2006.01) |

(52) U.S. Cl. ................. 380/200; 380/239; 380/277; 725/31; 726/27

(58) Field of Classification Search ........... 380/200, 380/239, 277; 725/31; 726/27
See application file for complete search history.

(56) References Cited

U.S. PATENT DOCUMENTS

| 5,742,677 | A | 4/1998 | Pinder et al. | |
| 2003/0108199 | A1* | 6/2003 | Pinder et al. | ............... 380/200 |
| 2003/0200548 | A1 | 10/2003 | Baran et al. | |
| 2004/0052377 | A1* | 3/2004 | Mattox et al. | ............... 380/277 |
| 2004/0177369 | A1* | 9/2004 | Akins, III | ................ 725/31 |
| 2004/0187014 | A1* | 9/2004 | Molaro | ................ 713/200 |
| 2004/0190721 | A1* | 9/2004 | Barrett et al. | ............... 380/277 |
| 2005/0066355 | A1* | 3/2005 | Cromer et al. | ................ 725/31 |
| 2005/0102385 | A1* | 5/2005 | Muhonen et al. | ............ 709/223 |
| 2006/0242072 | A1* | 10/2006 | Peled et al. | .................... 705/51 |

FOREIGN PATENT DOCUMENTS

EP    0 989 743 A    3/2000

* cited by examiner

*Primary Examiner*—Kambiz Zand
*Assistant Examiner*—Benjamin A Kaplan
(74) *Attorney, Agent, or Firm*—Harness, Dickey & Pierce, P.L.C.

(57) ABSTRACT

The present invention proposes a method for managing rights of subscribers to a pay-television system comprising an access control system to which are connected subscriber management systems each managed by an operator and a plurality of subscriber decoders, said decoders each being equipped with a security module containing the rights for each subscriber allowing him the decryption of encrypted digital data of a stream broadcasted by at least one operator, during a modification of the rights carried out by an operator in the security module of a subscriber, the control access system receives data identifying a subscriber with modification commands of rights of said subscriber coming from a subscriber management system of an operator, generates a management message containing the modified rights and transmits said message to the security module of the subscriber via the stream containing the encrypted data, said method comprising the step of verification of the modifications according the properties and the available resources of the security module and the step of generation of the management message containing the modified rights when the result of the comparison is positive.

9 Claims, 2 Drawing Sheets

US 7,715,557 B2

METHOD FOR MANAGING RIGHTS OF SUBSCRIBERS TO A MULTI-OPERATOR PAY-TELEVISION SYSTEM

FIELD OF THE INVENTION

The present invention relates to the domain of Pay-TV or more particularly to the management of subscriber rights when the access control system is connected to several operators. This system is responsible for managing a plurality of subscriber decoders by authorizing or not the decryption of audio and/or video programs according to the rights that they have acquired from the operators.

BACKGROUND OF THE INVENTION

The functioning of a decoder is managed by a security module or chip card containing the data pertaining to a subscriber. This data comprise rights paid by the subscriber allowing him to decrypt audio and/or digital video programs broadcasted by an operator via a cable, a satellite or any other diffusion network.

Each operator has and manages a database containing the data related to the contract that each subscriber has agreed with the operator. These databases are connected to an access control system that one of its functions is the generation of management messages called EMM "Entitlement Management Messages", that is to say messages containing the commands intended for a decoder or a group of decoders. These messages are broadcasted in the data stream of audio and/or video programs and are processed by the security module of the decoder. The latter stores the rights authorizing or not the decryption of a program that a subscriber has requested from an operator.

The document EP0989743 describes a method for transmitting, in a digital data stream, a table containing information concerning applications related to a set of services. This table allows namely to decide on the maintenance or not of certain applications during switching from one service to another included in a bouquet. The decoder stores the table in a memory and controls the downloading and the updating of the applications in function of the information contained in the table.

The document U.S. Pat. No. 5,742,677 discloses a subscriber terminal comprising a secured non-volatile memory configurable under the control of a local server or head end. The memory can be directly accessible by service providers, which transmit messages including commands without the intervention of the head end in condition that these providers are certified.

According to a known configuration, each digital television operator manages a group of subscribers having at least one functioning decoder with a security module provided by the operator. When a subscriber wishes to decrypt the programs of another operator, he is invited to replace the security module of the first operator with that of the second operator from whom he has bought the rights corresponding to programs that are only managed by this other operator. This change of security module is only possible with a decoder provided with a module in the form of a removable smart card or selectable cards inserted into several card readers.

This type of configuration presents a drawback at time of the increase of the number of specialized operators who each propose a card to be inserted into the decoder to be able to decrypt their programs. Therefore, a subscriber may be forced to change cards each time the type of program is changed. For example, during the showing of a sports program, then a film, then a variety program and then a sports program again, the subscriber may change the card up to three times.

SUMMARY OF THE INVENTION

The aim of this invention is to avoid in particular this drawback by allowing the use of a fixed security module in the decoder by offering to the subscriber the possibility of a subscription with several operators. Furthermore, in the case of decoders with removable cards, this invention allows the reduction of the number of cards necessary to the subscriber when he desires to decrypt the programs originating from different operators.

This aim is achieved by a method for managing rights of subscribers to a pay-television system comprising an access control system to which are connected subscriber management systems each managed by an operator and a plurality of subscriber decoders, said decoders each being equipped with a security module containing the rights pertaining to each subscriber allowing him to decrypt the encrypted digital data of a stream broadcasted by at least one operator, during a modification of the rights carried out by an operator in the security module of a subscriber, the control access system receives data identifying a subscriber with modification commands of rights of said subscriber coming from a subscriber management system of an operator, generates a management message containing the modified rights and transmits said message to the security module of the subscriber via the stream containing the encrypted data, said method is characterized in that the modifications are verified according the properties and the available resources of the security module and in that the management message containing the modified rights is generated when the result of the comparison is positive.

The security module used in the decoder can store rights that allow the decryption of audio-video digital data originating from several operators thanks to a memory that is divided into several areas each allocated to an operator. The storage capacity is defined by each operator according to the format and the structure of the rights data to be stored.

A modification of the rights of a subscriber transmitted by the right management system of an operator to the access control system is first verified by the latter according to the characteristics of the security module of the subscriber. In fact, the content of the memory area available to a given operator depends on existing rights and the total size of the data obtained after their modification.

When the result of the verification is positive, that is to say that it is possible to store the data relating to the modified rights in the storage area attributed to the concerned operator, the access control system transmits a management message to the security module. This message contains the modified rights that can either be added to those existing in the security module or can replace them.

The verification gives a negative result when the modification of the rights is incompatible with the available resources of the security module, that is to say the size of the free storage area. This occurs when the total size of the data of existing rights and the data of modified rights exceeds the size of the available storage area. The access control system then transmits an error message towards the operator's subscriber management system. The latter can propose to the subscriber a new configuration of his rights by deleting, for example, those which are not used in order to reduce the size of the data to be stored in the security module. The subscriber management system then transmits a new set of commands that will be successfully verified by the access control system that will be able to transmit the suitable management message to the security module of the subscriber.

The access control system includes in a way a filter in charge to eliminate data modifications of rights that cannot be implemented in the security modules of the subscribers either due to a lack of storage capacity, or because of the data already present in said memory.

BRIEF DESCRIPTION OF THE DRAWINGS

The invention will be better understood thanks to the following detailed description that refers to the enclosed drawings that are given as non-limitative examples, namely.

DETAILED DESCRIPTION

Figure 1:
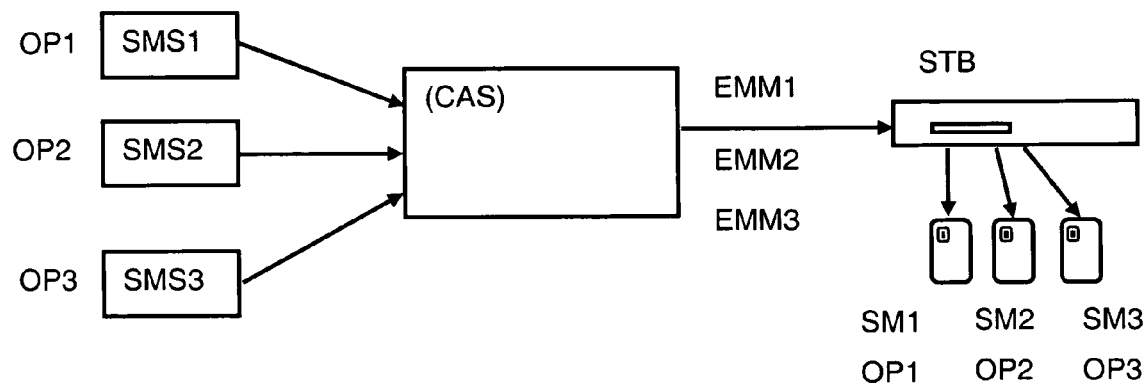
FIG. 1 shows a block diagram bringing together the subscriber management systems and an access control system to which a decoder according to the prior art is connected.

FIG. 1 shows the known configuration of an access control system (CAS) connected to a Subscriber Management System (SMS1), (SMS2) and (SMS3) each including a database managed respectively by operators (OP1), (OP2) and (OP3). These databases contain, among other data, data defining the identity of a subscriber and the profile of his contract, data regarding the equipment of the subscriber (type, properties, configuration and identifier of the decoder and of security modules), data relating to the products and/or services (audio and/or video programs, software, updates) that the subscriber has bought and data relating to the account of the subscriber (invoices paid, balances and credits of account). Extracts of this data are transmitted to the access control system (CAS) that has a function consisting in interpreting and compiling the received data to form management messages EMM "Entitlement Management Messages"; (EMM1), (EMM2) and (EMM3) intended to the subscribers decoders or "Set Top Box" STB. In this example, a subscriber has subscribed to audio and/or video programs selected from three operators (OP1), (OP2) and (OP3), and has the corresponding security modules or chip cards (SM1), (SM2) and (SM3). The characteristics of these subscriptions are translated into decryption rights stored on the chip cards (SM1), (SM2) and (SM3) that the access control system updates thanks to management messages (EMM1), (EMM2) and (EMM3) respectively. Therefore each change, such as a new purchase of a program or a modification of an access period to a program, for example from an operator (OP1), is registered in the database of its subscriber management system (SMS1). The latter transmits these changes to the access control system (CAS) that generates a modified message (EMM1) that will be introduced into the broadcasted programs stream. The decoder (STB) of the subscriber receives this stream, extracts the message (EMM1) that will be forwarded to the chip card (SM1) corresponding to the operator (OP1) previously inserted in the decoder (STB).

Figure 2:
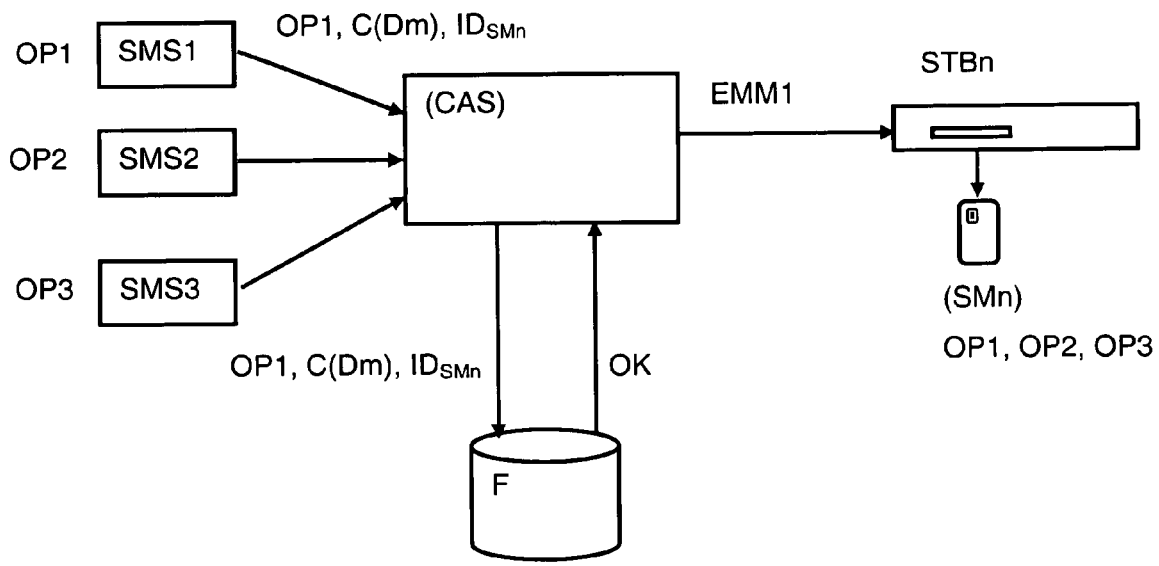
FIG. 2 shows a block diagram bringing together the subscriber management systems and an access control system provided with a filtering module according to the present invention, with the acceptance of a right modification by the filtering module.

FIG. 2 represents a block diagram similar to that of FIG. 1 but whose access control system is configured in order to function according to the method of the invention. In this case, the operators (OP1), (OP2) and (OP3) can transmit commands that serve to modify parameters in the subscriber security modules (SMn). It is not a question of pooling data of different operators in a global database but only to complete current subscriptions with programs and/or supplementary services for example. In fact, in this configuration, each database associated to subscriber management systems (SMS1), (SMS2) and (SMS3) remains independent and transmits commands C (Dm) and identifiers (IDSMn) of subscriber security modules (SMn) to the access control system (CAS), which is common to all the operators (OP1, OP2, OP3). On reception of this data (C (Dm), IDSMn), originating from any of the three operators (OP1, OP2, OP3), the access control system (CAS) transfers said data in a software-filtering module (F).

For example, when an operator (OP1) sends a command C (Dm) in order to extend the rights Dm of a subscriber identified by the identifier (IDSMn) of his security module (SMn) that authorizes him to access certain supplementary programs, the action is accepted by the filtering module (F) only if it can be carried out by the security module (SMn) of the decoder (STBn) of the subscriber.

In such a case the filtering module (F) receives a data group comprising an identifier of the operator, here (OP1), an identifier (IDSMn) of the security module (SMn) and a command C(Dm) of right modification in the storage area of the security module (SMn) attributed to the operator (OP1). This data is verified by a comparison with that contained in the database of the access control system (CAS). This base contains, in particular, the characteristics of the security modules (SMn) of each connected subscriber, as well as data describing the rights stored in each storage area allocated to each operator. The result of this verification is positive when the modified rights (Dm) can be stored in the security module (SMn). In other words, the storage capacity occupied by the new rights added to those already existing in the security module is lower or equal to the maximum capacity allocated to the operator. Once this condition is fulfilled, the filtering module (F) transmits an acceptance response (OK) to the access control system (CAS). The latter generates a management message (EMM1) for the security module (SMn) connected to the decoder STBn. This message (EMM1) updates the contents of the security module (SMn) according to the command C(Dm) previously transmitted by the management system of the subscribers (SMS1) depending on the operator (OP1).

Figure 3:
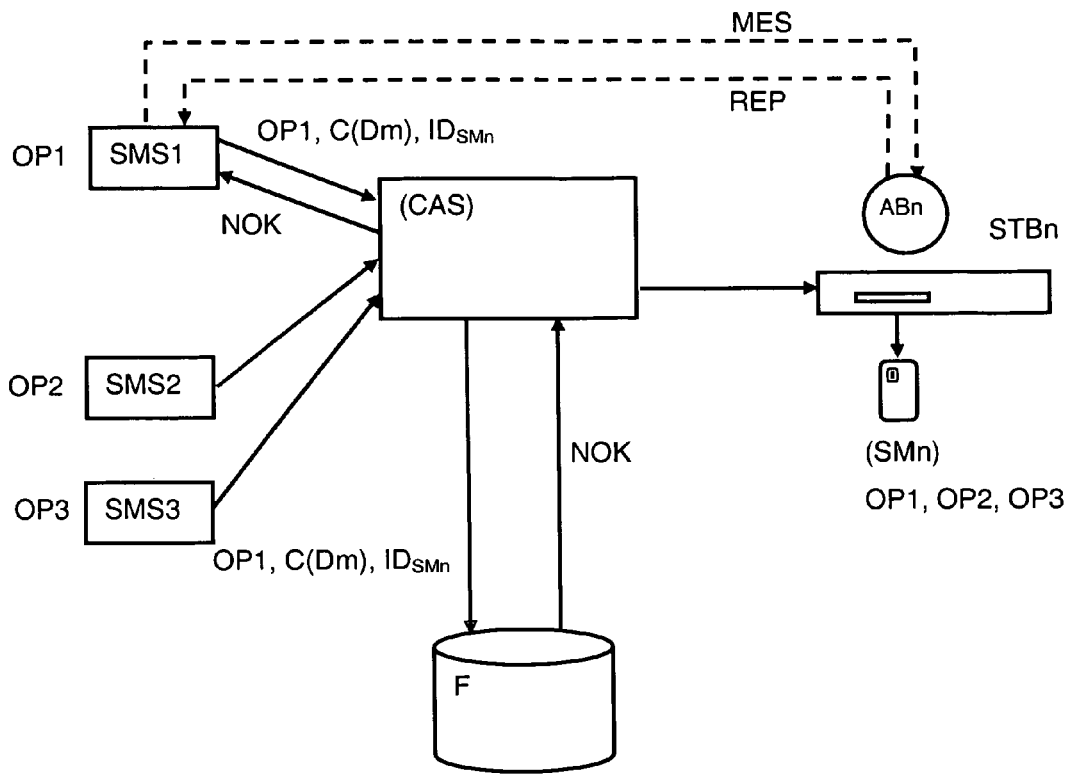
FIG. 3 shows the block diagram of FIG. 2 with the refusal of a right modification by the filtering module.

FIG. 3 shows the block diagram of FIG. 2 wherein the verification of the data associated to a right modification command C(Dm) by the filtering module (F) gives a negative result. This situation occurs when the modified rights (Dm) cannot be stored in the security module (SMn) because the total size of the data after modification is larger than the size of the storage area available in the security module (SMn). The filtering module (F) then transmits a refusal response (NOK) in form of an error message indicating to the access control system (CAS) that the modifications are not acceptable by the security module (SMn). This refusal response (NOK) is then returned to the subscriber management system (SMS1) of the operator (OP1) in question. The latter warns the subscriber (Abn) by means of a message (MES) by proposing him the selection of a new configuration of his rights (Dm) or a new bouquet by deleting and/or by replacing the superfluous rights stored in the security module (SMn). The subscriber (Abn) transmits a response (REP) to the operator (OP1) that will transmit the new modification command C' (Dm) to the access control system (CAS). The filtering module (F) proceeds to a new verification that leads to a positive result thanks to a reduced size of the data set to be stored allowing the generation of a management message (EMM1) (see FIG. 2).

Figure 4:
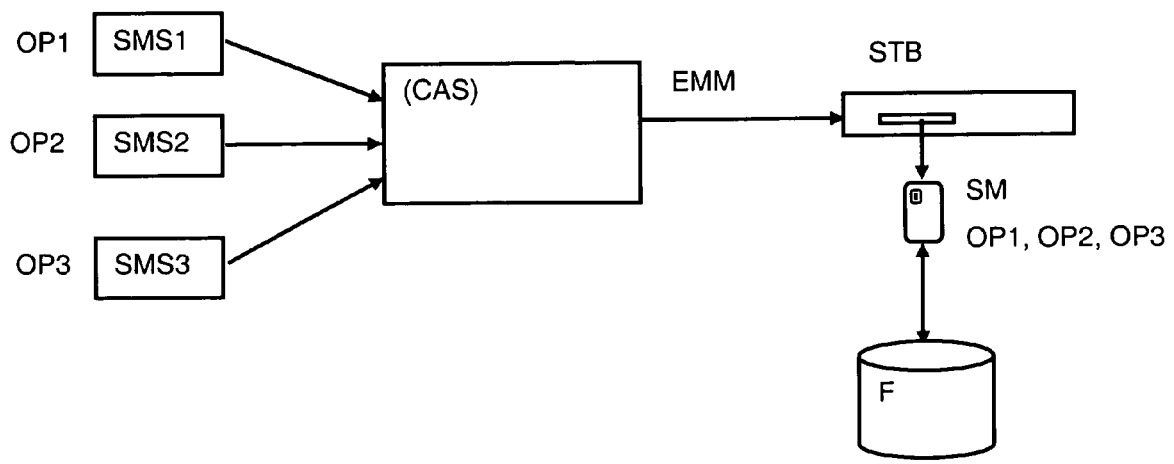
FIG. 4 shows an embodiment of the block diagrams of FIGS. 2 and 3 where the filtering module is included in the security module.

According to an embodiment of this invention shown by FIG. 4, the filtering module (F) is included in the security module (SMn) of the decoder (STBn) instead of being integrated into the access control system (CAS). In this case, the management messages (EMM) generated by the access control system (CAS) include supplementary fields containing the identifiers of different operators (OP1), (OP2) and (OP3) accompanied by the modification commands C(Dm) to be carried out by the security module (SMn). The latter stores and analyzes the message (EMM) and verifies the modifications of rights (Dm) transmitted by an operator (OP1, OP2, OP3) according to the storage area capacity of the security module attributed to the operator. The modifications leading to an overload of storage capacity in the security module are eliminated. A suitable message is then displayed on the screen associated to the decoder inciting the subscriber to request a new modification compatible with the resources of his security module (SMn) as described in the previous embodiment.

Of course, the subscriber right management method, according to the invention, operates both in the configurations wherein the decoder has a return channel as well as in those where said channel is absent. In the latter case, the responses of the subscriber to the warning messages issued from rejected right modifications can be transmitted to the operator by telephone, fax, e-mail or post.

The invention claimed is:

1. A method for managing rights of subscribers to a pay-television system comprising an access control system to which are connected subscriber management systems each managed by an operator and a plurality of subscriber decoders, said decoders each being equipped with a security module containing the rights for each subscriber allowing the decryption of encrypted digital data of a stream broadcasted by at least one operator, during a modification of the rights carried out by an operator in the security module of a subscriber, the method comprising:
   receiving, by the access control system, data identifying a subscriber with commands for modifying the rights in the security module of the subscriber's decoder, the data being sent by a subscriber management system of an operator;
   verifying, by a filtering module connected to the access control system, the rights' modifications according to security module resources including available storage capacity depending on format and structure of the stored rights data and rights data to be stored;
   when the rights modifications are acceptable by the security module, generating a management message containing the modified rights;
   transmitting said management message to the security module of the subscriber's decoder via the broadcasted stream containing the encrypted digital data; and
   if the verification of the rights modifications fails, transmitting by the subscriber management system a warning message to the subscriber, said message proposing a new configuration of the rights to said subscriber by deletion and/or replacement of the superfluous rights stored in the security module.

2. The method of claim 1, wherein the access rights to encrypted digital data originating from several operators are stored in the security module in predefined storage areas allocated to each operator.

3. The method of claim 1, wherein the filtering module transmits an acceptance response leading to the generation of the management message when the total size of the data of existing rights and the data of modified rights is lower or equal to the size of the available memory area in the security module.

4. The method of claim 1, wherein the filtering module transmits a refusal response to the access control system when the total size of the data of existing rights and of the data of modified rights is larger than the size of the available storage area in the security module.

5. The method of claim 4, wherein the refusal response is returned to the subscriber management system.

6. The method of claim 1, wherein the subscriber transmits a response to the operator that will transmit a new modification command to the access control system, the filtering module proceeds to a new verification leading to a positive result thanks to the new data of a reduced size to be stored in the security module followed by the generation of a managing message.

7. The method of claim 6, wherein the response is transmitted by the return channel of the decoder of the subscriber.

8. Method according to claim 6, wherein the response is transmitted by telephone, fax, e-mail or post, when the return channel of the decoder is absent.

9. A method for managing rights of subscribers to a pay-television system comprising an access control system to which are connected subscriber management systems each managed by an operator and a plurality of subscribers' decoders, said decoders each being equipped with a security module containing the rights for each subscriber allowing the subscriber the decryption of encrypted digital data of a stream broadcasted by at least one operator, during a modification of the rights carried out by an operator in the security module of a subscriber, the method comprising:
   receiving, by the access control system, data identifying a subscriber with commands for modifying the rights in the security module of the subscriber's decoder, the data being sent by a subscriber management system of an operator;
   generating a management message containing the modified rights, and including supplementary fields containing identifiers of different operators accompanied by commands of right modification;
   transmitting said management message to the security module of the subscriber's decoder via the broadcasted stream containing the encrypted digital data, said security module including a filtering module, which stores, analyzes the management message and verifies the modifications of rights transmitted by an operator according to a storage area capacity of the security module attributed to said operator; and
   if the verification of the modification of rights fails, displaying a suitable warning message on a screen associated with the decoder, the message including an indication to request a new modification of the rights that is compatible with resources of the security module.

* * * * *